United States Patent [19]
Wertheimer

[11] Patent Number: 5,623,909
[45] Date of Patent: Apr. 29, 1997

[54] INJECTION TIMING AND POWER BALANCING CONTROL FOR GASEOUS FUEL ENGINES

[75] Inventor: Harry P. Wertheimer, Painted Post, N.Y.

[73] Assignee: Dresser-Rand, Wellsville, N.Y.

[21] Appl. No.: 237,199

[22] Filed: May 3, 1994

[51] Int. Cl.$^6$ ............................................. F02M 37/04
[52] U.S. Cl. .................................... 123/501; 123/527
[58] Field of Search ........................... 123/527, 276 E, 123/357, 358, 436, 501, 179.17

[56] References Cited

U.S. PATENT DOCUMENTS

| | | | |
|---|---|---|---|
| 3,664,311 | 5/1972 | Endo . | |
| 4,177,516 | 12/1979 | Mason | 123/358 |
| 4,357,662 | 11/1982 | Schira | 123/436 |
| 4,397,282 | 8/1983 | Salway . | |
| 4,667,634 | 5/1987 | Matsumura | 123/436 |
| 4,708,112 | 11/1987 | Nanjyo | 123/357 |
| 4,770,135 | 9/1988 | Jautelat et al. . | |
| 4,796,592 | 1/1989 | Höfer et al. . | |
| 4,807,572 | 2/1989 | Schlunke et al. . | |
| 4,865,001 | 9/1989 | Jensen | 123/276 E |
| 4,926,806 | 5/1990 | Ahern et al. . | |
| 5,003,952 | 4/1991 | Weglarz et al. . | |
| 5,054,444 | 10/1991 | Morikawa . | |
| 5,086,737 | 2/1992 | Watanabe et al. . | |
| 5,111,789 | 5/1992 | Moriya | 123/357 |
| 5,203,305 | 4/1993 | Porter | 123/527 |
| 5,315,976 | 5/1994 | Birk | 123/357 |

*Primary Examiner*—Carl S. Miller
*Attorney, Agent, or Firm*—Nixon, Hargrave, Devans & Doyle

[57] ABSTRACT

According to the present invention, an apparatus and method for controlling injection timing and power balancing in a gaseous fuel engine with an electronic control unit and a shaft encoder is disclosed. The engine includes an engine block having at least one cylinder with an exhaust port and a cylinder head. A fuel injector and a spark plug is seated in the cylinder head and the injector has a valve which separates the fuel in the injector from the cylinder. A piston reciprocates in each cylinder and is attached to a connecting rod. The rod connects each piston to a crankshaft which converts the motion of the piston to rotary motion. The shaft encoder is connected to the crankshaft and monitors the revolutions of the crankshaft. The electronic control unit is coupled to the shaft encoder and to each of the fuel injectors. The method in accordance with the invention includes several steps. First, a working injection time setting the time for each fuel injector to start an injection of fuel into the cylinder is retarded to an initial injection time. Next, the speed of the crankshaft is measured and compared against a first preset limit. The working injection time is advanced at a predetermined rate, if the monitored speed exceeds the first preset limit. When the working injection time is advanced to be equal to or less than a programed function of speed, the working injection time is set to the injection time calculated from the programmed speed function. The method may also involve establishing a working pulse width for each cylinder, measuring an index of the power output in each cylinder, calculating a balancing factor in response to the measured index, and adjusting the working pulse width in response to the balance factor for each cylinder.

26 Claims, 10 Drawing Sheets

FIG.1

FIG. 2(a)
PRIOR ART
CAM OPERATED VALVE

FIG. 2(b)
EFGI AT 13ms, 100 RPM

INJECTION TIMING AND POWER BALANCING CONTROL FOR GASEOUS FUEL ENGINES

FIELD OF THE INVENTION

This invention relates generally to injection timing and power balancing control for a two-stroke gaseous fuel engine, and in particular, to controlling the injection timing and output power in each cylinder in response to engine operating conditions and engine type.

BACKGROUND OF THE INVENTION

Large gaseous fuel engines are often operated at injection timings which are less than optimum and with the output power from each of the cylinders relative to the others unbalanced. Obtaining control over injection timing and power balancing to operate gaseous fuel engines at optimum settings has been a problem.

Many large gaseous fuel engines do not operate at optimum settings because the fuel injection valves in these engines are operated by mechanical cam-driven valve trains. In these engines, the injection timing and the duration each valve is held open is fixed by the cam's profile and the cam's phase relationship to the engine's crankshaft. Although the start of the injection timing and the duration of the injection with a mechanical cam-driven valve train can be varied, the modifications required are complex and are often less than ideal.

Other engines do not operate at optimum settings because they fail to take into account or do not address the variety of factors, including engine operating conditions and engine usage, which can affect the desired time to start the injection of fuel for each cylinder. For example, in a gaseous fuel two-stroke engine, the injection timing should be set to start at a time which will minimize the amount of fuel which could escape through the exhaust port. Additionally, the injection timing should be adjusted to maximize time for fuel and air to mix. For example, direct cylinder fuel injection applied to liquid fuel two-stroke engines requires that the liquid fuel be given time to vaporize in the cylinder. To accomplish this, liquid fuel engines typically have fuel injection timing advanced for starting only. However, with fuels which are injected into the cylinders in the gaseous state, the time at which the injection of fuel is to start does not need to be advanced because when the gaseous fuel enters the cylinder it is ready for combustion.

In addition to problems with injection timing, balancing the power output between cylinders in an engine has also posed a challenge. Typically, power balancing has been accomplished manually by adjusting the throttle valve for each cylinder in the engine until the power output by each cylinder is about equal. Although these manual adjustments are reasonably effective, they are time consuming and must be redone each time the operating conditions for the engine change.

Accordingly, there is a need for an injection timing and power balancing control in a two-stroke, gaseous fuel engine.

SUMMARY OF THE INVENTION

According to the present invention, an apparatus and method for automatically controlling injection timing and power balancing in a gaseous fuel engine with an electronic control unit and a shaft encoder is disclosed. The engine includes an engine block having at least one cylinder with an exhaust port and a cylinder head. A fuel injector is seated in the cylinder and has a valve which separates the fuel in the injector from the combustion chamber in the cylinder. A piston reciprocates in each cylinder and is attached to a connecting rod. The rod connects each piston to a crankshaft which converts the motion of the piston to rotary motion. The shaft encoder is connected to the crankshaft and monitors the revolutions of the crankshaft and generates control pulses. The electronic control unit is coupled to the shaft encoder and to each of the fuel injectors.

The method in accordance with the invention includes several steps. Note that although the term injection time is used in the following description, it is understood that the electronics controls a pulse whose initiation causes the injector to open a short time later (typically 5 milliseconds). First an initial injection time is established. The speed of the crankshaft is measured and compared against a first preset limit. Meanwhile, an injection time is computed as a predetermined function of engine speed. Until the speed of the crankshaft exceeds the first preset limit, the effective or working injection time is the same as the initial injection time.

When the monitored speed exceeds the first preset limit, the working injection time is advanced at a predetermined fixed rate with respect to time. (Advancing is numerically reducing the crank angle with respect to i.e. Top Dead Center.) When the working injection time has advanced to be equal to or less than the injection time computed as a function of engine speed, the working injection time is thereafter maintained at the injection time computed as a function of engine speed until the engine is shut down.

The method may also involve establishing a working pulse width for control of the duration of injection into the cylinders. A means such as average peak firing pressure may be used to infer the relative power output from each cylinder, and this information may be used to calculate a balance factor for each cylinder which, when multiplied with the working pulse width, adjusts the duration of injection for each cylinder so as to improve the power balancing of the engine.

The injection timing and the power balancing control provide several advantages. With the injection timing control, fuel loss through the exhaust port at start-up and overall emissions of unburned hydrocarbons is minimized. Additionally, the fuel injectors are set at or near optimum fuel injection settings for starting the injection and for the duration of the injection over a range of speeds and conditions. Further, the injection timing can be adjusted to operate at optimum timing settings for starting the delivery of gaseous fuel, as opposed to liquid fuel, to the cylinders. With power balancing control, the power output in each cylinder can be balanced to improve engine smoothness, and emissions, and to extend the life of the engine. Additionally, this balancing can be achieved automatically, without time consuming iterations, and can be maintained over a wide range of operating conditions.

BRIEF DESCRIPTION OF THE DRAWINGS

FIGS. 5(a–d) are flowcharts illustrating the operation of the electronic power balancing control; and

DETAILED DESCRIPTION OF THE INVENTION

Figure 1:
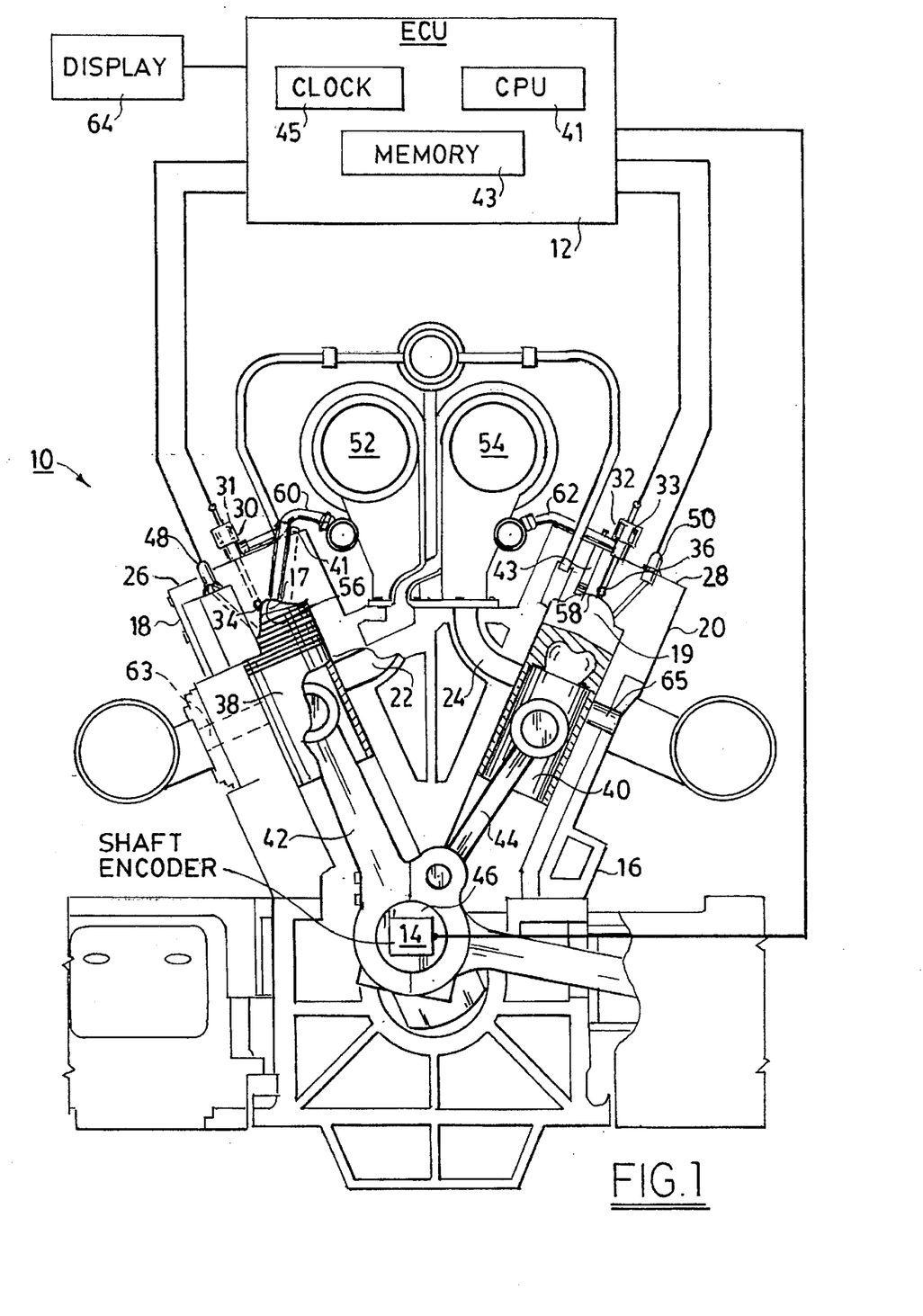
FIG. 1 is a perspective view of a two-stroke gaseous fuel engine with the electronic control unit in accordance with one embodiment of the present invention.

An apparatus and method in accordance with the present invention is illustrated generally in FIG. 1. The apparatus includes a gaseous fuel engine 10, an electronic control unit ("ECU") 12, and a shaft encoder 14. The method in accordance with the invention includes several steps. First, a working injection time ("WIT"), which is the time in terms of crank angle with respect to a fixed reference point, such as top dead center ("TDC"), at which fuel injectors 30, 32 begin to inject fuel into the cylinders 18, 20, is retarded to an initial injection time. Next, the speed of the crankshaft 46 is measured and is compared against a first preset limit. When the measured speed exceeds the first preset limit, WIT is advanced at a predetermined rate with respect to time. When WIT is equal to or less than a predetermined function of engine speed ("PFIT"), WIT is set to PFIT. The method may also involve establishing a working pulse width ("WPW"). A means such as measured average peak firing pressure in combustion chambers 17, 19 may be used to infer the relative power output from each of the cylinders 18, 20, and this information may be used to calculate a balance factor for each cylinder 18 and 20 which, when multiplied with the working pulse width, adjusts the duration of injection for each cylinder 18 and 20 so as to better balance the power output between them.

Referring more specifically to FIG. 1, a perspective view of the gaseous fuel engine 10 with ECU 12, shaft encoder 14, pressure transducers 48 and 50, and display 64 in accordance with one embodiment of the present invention is illustrated. In this particular embodiment, the gaseous fuel engine 10 is a two-stroke, gaseous fuel engine. Engine 10 has an engine block 16 with two cylinders 18, 20 with combustion chambers 17, 19, exhaust ports 22, 24 which leads to exhaust ducting 52, 54, and intake ports 63, 65. Although in this particular embodiment a two-stroke engine 10 with two cylinders 18, 20 is shown, the invention is also applicable to four-stroke engines and to engines with greater and fewer than two cylinders. The cylinder heads 26, 28 seal the top of cylinders 18, 20. Fuel injectors 30, 32, such as electro-hydraulic fuel injectors or solenoid fuel injectors and spark plugs 41, 43 are located in cylinders heads 26, 28. Fuel injectors 30, 32 include valves 34, 36 which are adjacent roofs 56, 58 of cylinder heads 26, 28 and fuel injector actuators 31, 33 which control valves 34, 36. The valves 34, 36 control when fuel is metered out to cylinders 18, 20. Fuel lines 60, 62 supply gaseous fuel, such as natural gas, to fuel injectors 30, 32. Pistons 38, 40 reciprocate in cylinders 18, 20 and are attached to connecting rods 42, 44. Connecting rods 42, 44 are also connected to a crankshaft 46 which converts the motion of each piston 38, 40 in the cylinders 18, 20 to rotary motion.

ECU 12 includes a microprocessor or CPU 41, a memory 43, and a clock 45 and is coupled to fuel injector actuators 31, 33, such as electro-hydraulic mechanisms or solenoids, shaft encoder 14, pressure transducers 48 and 50, and display 64. The ECU 12 controls when the fuel injector actuators 31, 33 open and close valves 34, 36 for fuel injectors 30, 32. Memory 43 has a program stored, in a manner well known in the art, which causes the automatic operation of the injection timing and power balancing control.

Shaft encoder 14 is connected to crankshaft 46 and generates a "zero-reference" pulse or "reset" pulse I1 each time the shaft encoder detects a complete revolution of the crankshaft 46. The time which the reset pulse is generated each revolution of the crankshaft 46 will, depend on how shaft encoder 14 is mounted on crankshaft 46. Shaft encoder 14 also generates a series of evenly spaced counter pulses during each complete revolution of the crankshaft 46. In this embodiment, shaft encoder 14 generates 1440 counter pulses each revolution of crankshaft 46.

Pressure transducers 48, 50 are located in cylinder heads 26, 28 and monitor the peak pressure output of cylinders 18, 20. Although pressure transducers 48, 50 are shown, any type of sensors which could measure an index of output power in cylinders 18, 20 could be used.

The engine 10 in this particular embodiment operates on a two-stroke cycle. For ease of discussion, the operation of the engine 10 will hereinafter be explained with reference to only one cylinder 18, however the operation explained below is applicable to all of the cylinders in an engine in accordance with this invention. In a two-stroke engine, such as 10, the spark plug 41 ignites the mixture of fuel and air in the combustion chamber 17, usually just before the piston 38 reaches the TDC of its' stroke. The expanding products of combustion force the piston 38 downward. Part way down, the piston 38 uncovers the exhaust port 22 and a short distance further the piston 38 also uncovers the intake port 63. A supercharger (not shown) driven either by the crankshaft 46 or from a turbine in the exhaust ducting 52 and 54, provides air under pressure which issues into the cylinder 18 through the intake port 63 and scavenges the cylinder 18 of most of the exhaust gases. As the piston 38 moves upward, this scavenging process continues until first the intake port 63 and then the exhaust port 22 are again covered by the piston 38.

When commanded to do so by the ECU 12, actuator 31 will cause the fuel injector 30 to open. The injector 30 is commanded to open either during or after the period that the exhaust port 22 is uncovered by the piston 38. the pressure of the fuel in fuel line 60 is well above the scavenge air pressure at intake port 63. Thus fuel will flow into the cylinder 18 until either the pressure in the cylinder rises above the fuel pressure or the ECU 12 commands the injector to close. The amount of fuel delivered during a cycle is determined primarily by the duration of the pulse (WPW multiplied by the balance factor) from the ECU 12, as explained in greater detail later. How much fuel escapes through exhaust port 22 and how much time is available for mixing the fuel and air depends on the timing for the start of injection (WIT) and also on the duration of injection. Piston 38 is driven up towards the cylinder head 26 pushing the fuel, air and residual exhaust up towards cylinder head 28 and also out exhaust port 22. Eventually, when piston 38 passes exhaust port 22, the fuel, air, and any remaining exhaust are sealed in cylinder 18. When the piston 38 nears the top of cylinder 18, the air-fuel mixture is ignited by spark plug 41, driving the piston 38 down to begin another cycle.

Figure 2A:
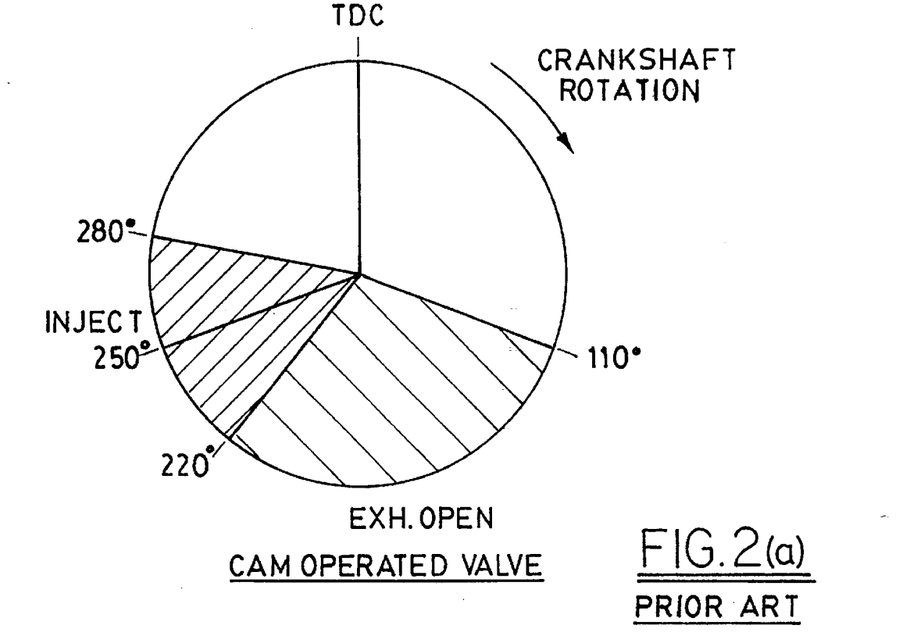
FIG. 2(a) is a diagram illustrating injection timing in an engine with a prior art mechanical cam driven valve train in relation to the opening of the exhaust port.
Figure 2B:
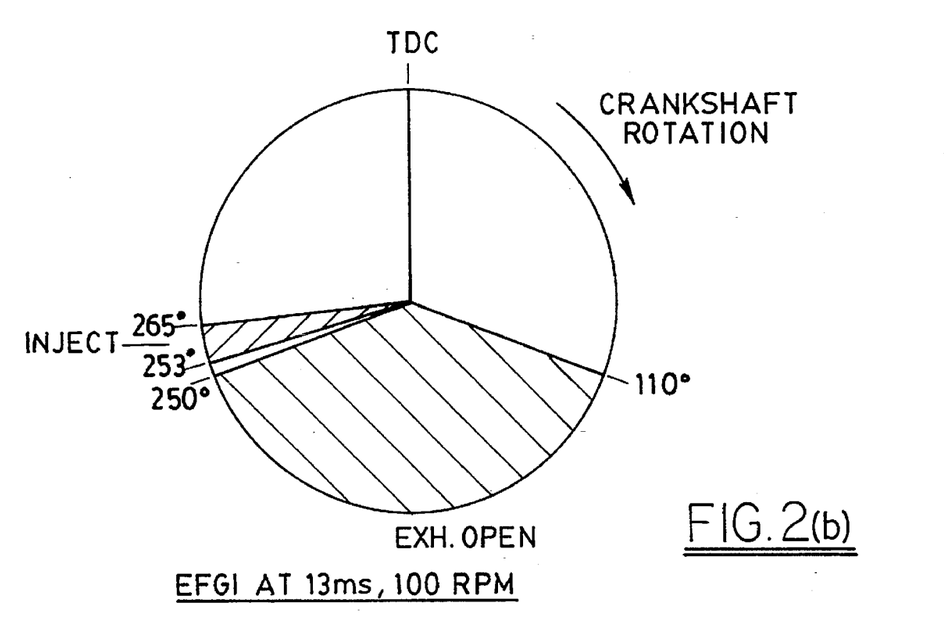
FIG. 2(b) is a diagram illustrating injection timing in an engine with an electronic fuel injector in relation to the opening of the exhaust port.

Referring to FIGS. 2(a) and 2(b), two diagrams illustrating injection timing with respect to exhaust port 22 opening in an engine are illustrated. In this particular embodiment, exhaust port 22 is open between 110° after top dead center ("ATDC") and 250° ATDC. In FIG. 2(a), fuel injector 30 is operated by a prior art mechanical cam-driven valve train which is not shown. As discussed earlier, the timing of the start of the injection time and the duration of the injection is dictated by the cam's profile and the cam's phase relationship to the crankshaft. In this particular example, the fuel injector is opened at 220° ATDC and is closed at 280° ATDC. As shown by FIG. 2(a), the fuel injector is open while the exhaust port is open allowing fuel to escape from cylinder 18. In FIG. 2(b), the results of a fuel injector 30 operated in accordance with the present invention are shown. Fuel injector 30 is open at 253° ATDC and is closed at 265° ATDC. Accordingly, with ECU 12 the start and duration of the injection by fuel injector 30 can be adjusted so that fuel is only injected when exhaust port 22 is closed and only for the specific amount needed. As a result, less if any fuel escapes through exhaust port 22 and the amount of fuel delivered is the optimum amount necessary.

Figure 3A:
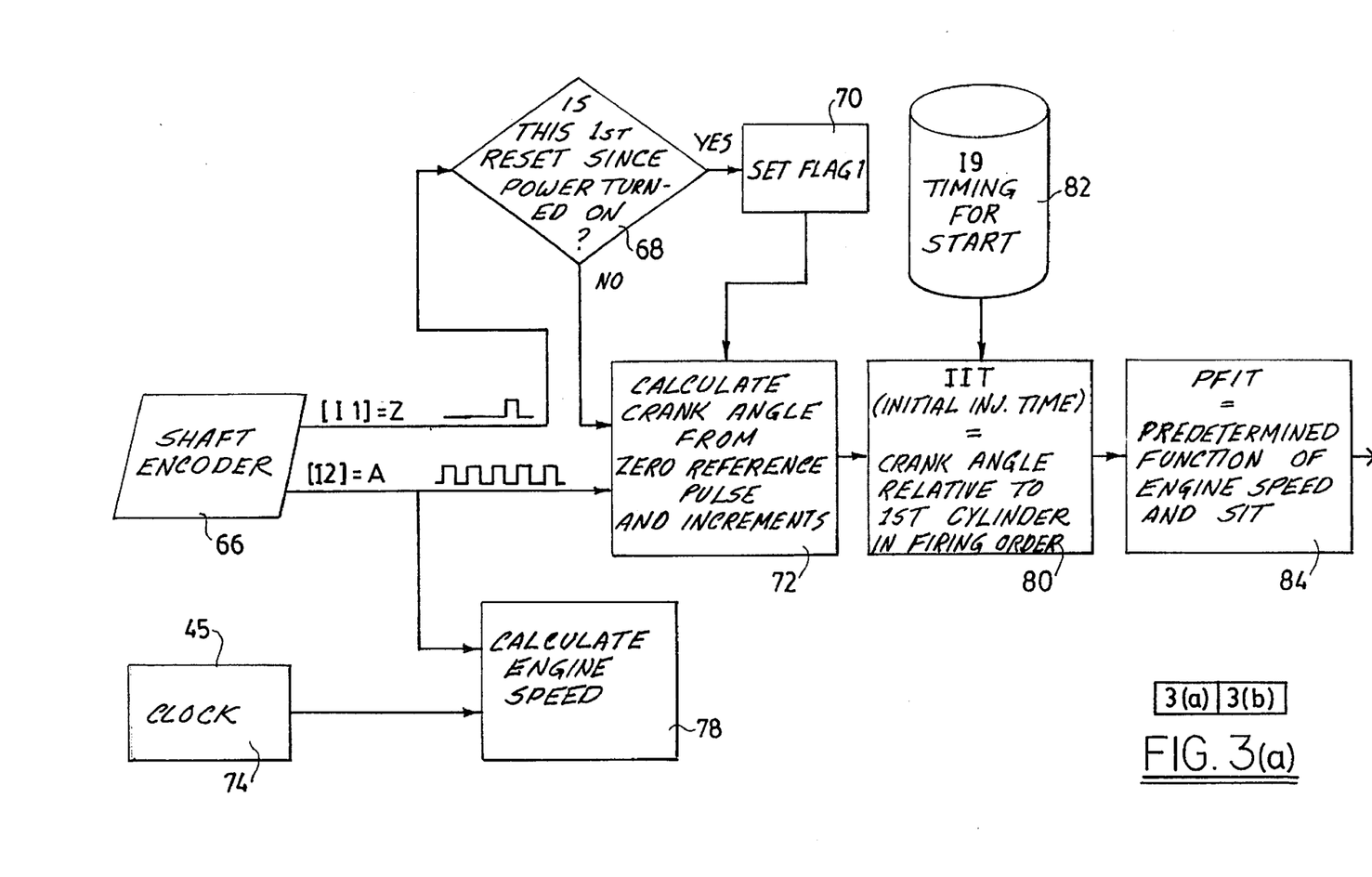
FIG. 3(a) is a flowchart illustrating the operation of the automatic injection timing control.
Figure 3B:
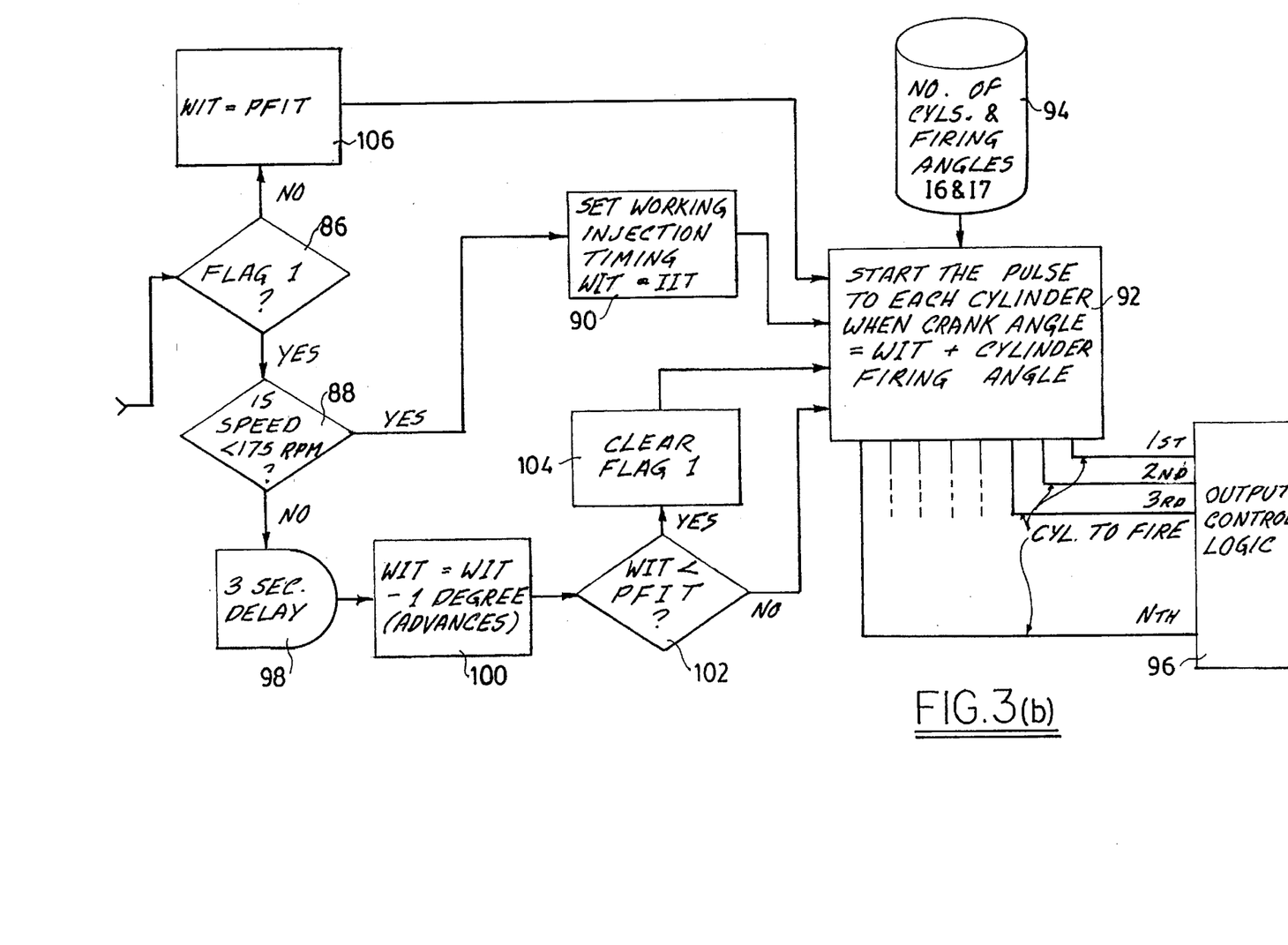
FIG. 3(b) is a continuation of the flowchart shown in FIG. 3(a)

Referring to FIGS. 3(a) and 3(b), a flowchart illustrating the steps of operation of the injection timing control is shown. In this particular embodiment, before fuel and ignition are turned on in the engine 10, the engine 10 must be first cranked-up by a suitable starter motor or other device (not shown) to operate at about 80 RPMs. Once the engine 10 is running at about 80 RPMs, fuel and ignition for engine 10 are turned on along with the power to ECU 12. Next, the shaft encoder 14 begins to monitor the revolutions of crankshaft 46 and generates a "zero-reference" or "reset" pulse I1 each time shaft encoder 14 detects a revolution of crankshaft 46 (Step 66). The relationship of the reset pulse I1 to the crankshaft's angular position depends upon the installation of shaft encoder 14, but once shaft encoder 14 is mounted the reset pulse will occur at the same crank angle every revolution. Shaft encoder 14 also generates a series of counter pulses I2 during each revolution of the crankshaft 46 (Step 66). In this particular embodiment, shaft encoder 14 outputs 1440 counter pulses per revolution of crankshaft 46. With the reset pulse I1 and counter pulses I2, ECU 12 always knows the angular position and speed of crankshaft 46, as explained further. ECU 12 monitors shaft encoder 14 in Step 68 and when ECU 12 detects the first reset pulse I1, ECU 12 stores in memory 43 that the first reset pulse I1 has been detected and the YES branch is taken to set an internal flag in memory 43 to one (Step 70). When the next reset pulse I1 is detected by ECU 12, the NO branch will be taken from Step 68. Next, either from the NO branch from Step 68 or the set flag in Step 70, the angular position of crankshaft 46 is calculated from the reset pulse I1 and the 1440 counter pulses I2 from shaft encoder 14 to within a quarter of a degree of resolution (Step 72). Meanwhile, in Step 74 a clock 45 outputs a continuous stream of pulses at a fixed frequency which is used with the counter pulses I2 from shaft encoder 14 to calculate engine speed in Step 78.

Once the angular position of crankshaft 46 has been calculated in Step 72, the initial injection timing or ("IIT") is calculated for each cylinder 18 and 20 (Step 80). IIT is the time in terms of crank angle from a fixed reference point, such as the reset pulse I1, at which the ECU 12 transmits a signal to fuel injector actuator 31 to open the valve 34 for fuel injector 30 to start the injection of fuel into combustion chamber 17 in cylinder 18. IIT is established in memory 43 through operator entry I9 via means such as a keypad (not shown) and becomes input in Step 82. For example, if it is was desired to start the pulse for the first fuel injector to inject fuel at 200 degrees after TDC, and the reset pulse I1 happened to wind up at 180 degrees after TDC, then the operator would enter twenty degrees to correct for the error and ECU 12 would signal first fuel injector actuator 31 to open the valve 34 twenty degrees after ECU 12 received the reset pulse I1 from shaft encoder 14.

Next in Step 84, the injection timing as a function of engine speed ("programmed function injection timing" or "PFIT") is calculated. After the engine 10 is started and is running at normal idle speed, PFIT is the empirically determined optimum time in terms of crank angle from a fixed reference point, such as the reset pulse I1, for fuel injector actuator 31 to open valve 34 to start the injection of fuel by fuel injector 30 (Step 84). In this particular embodiment, the predetermined function by which PFIT is calculated is: PFIT=IIT−0.046×RPM−27.8, although the predetermined function can vary based upon the particular embodiment. Both IIT and PFIT are stored in memory 43 in the ECU 12.

Once PFIT has been calculated, the status of the flag is checked (Step 86). If the flag is set to one, then engine speed, which was calculated earlier in Step 78, is checked (Step 88). If the speed of crankshaft 46 has not yet reached 175 RPMs, then the YES branch is taken to set working injection time ("WIT") to IIT (Step 90). Before WIT is set to IIT, WIT is at some arbitrary default setting. Although 175 RPMs is used in this particular embodiment, the speed selected as the limit can vary as needed and desired. Once WIT has been set to IIT, the output pulse to fuel injector actuator 31 in cylinder 18 is started when the crankshaft's crank angle (relative to the reset pulse I1)=WIT+the cylinder's firing angle (step 92). The firing angle for the first cylinder 18 in the firing order is normally zero. The number of cylinders I6 and their firing angles I7, needed for the calculations in Step 92, are input in Step 94, to ECU 12 and are usually stored in memory 43. Next, the start pulse for fuel injector actuator 31 for cylinder 18 is sent to the output control logic (Step 96). The above-noted steps are repeated for the each crankshaft revolution, with the variations to the above-noted steps described below.

ECU 12, as is typical for computers, loops repeatedly through its program which includes the coding for the equivalent of steps shown in FIGS. 3(a) and 3(b). When ECU 12 encounters the reset pulse I1 a second or subsequent time, the NO branch is taken in step 60. Further along, the status of the flag is checked again (Step 86) and if the flag is set at one, then the speed of the engine is checked (Step 88). If the speed of the engine is equal to or greater then 175 RPMs, then the NO branch is taken to start a three second delay (Step 98). The delay is used to advance WIT gradually from its retarded condition set for starting at ITT to the optimum timing for the engine speed which is PFIT. Although a three second delay has been selected, the length of the delay can vary as needed and desired. After the delay has expired, the WIT is advanced one degree towards PFIT (Step 100), although the amount of advancement can vary as needed and desired. Next, WIT is compared with the PFIT in Step 102. If WIT is equal or greater than PFIT, then the NO branch is taken and the output pulse to the fuel injector actuator 31 in cylinder 18 is started when the crankshaft crank angle=WIT+the cylinder's firing angle (Step 92). If WIT is less (more advanced) than PFIT in Step 102, then the YES branch is taken to clear the flag by resetting the flag to zero (Step 104) and then the output pulse to fuel injector 30 in cylinder 18 is started when the crankshaft crank angle= WIT+the cylinder's firing angle in Step 92.

The next time through, when the flag has been cleared, then in Step 86 the NO branch is taken. When the NO branch is taken, WIT is set equal to PFIT in Step 106 and the output pulse to fuel injector actuator 31 in cylinder 18 is started when the crankshaft's crank angle=WIT+the cylinder's firing angle (Step 92). WIT will remain equal to PFIT until the power to ECU 12 is shut off or until the engine's speed drops below a preset lower speed, 25 RPMs in this embodiment.

One example of a software implementation of the injection timing control is set forth below. The program is written in a special from of BASIC computer language, although the injection timing control could be implemented in any desired computer language suitable for ECU 12.

```
7000 'Automatic Injection Timing Control
    if RPM < 25 then FLAG1 = 1 'Happens on start up only
    PFIT = IIT – 0.077 * RPM – 20.6
    if FLAG1 = 0 then WIT = PFIT: goto 7200
    'Up to speed & timed out
    if RPM < 175 then WIT = IIT: goto 7200
    wait 200: WIT = WIT – 1 'advance 1 deg. every i.e. 2 sec
    if WIT < PFIT then FLAG1 = 0
    'End the timed advancing
```

Subsequent coding (not shown), specific to the computer used and which can be created in manners well known in the art, converts the value of WIT which is in degrees to encoder pulses, in this case multiplying by 4, and then sets the main injector timing.

Referring to FIGS. 4(a–e), diagrams illustrating the working injection time at different stages of the engine's operation are illustrated. In this particular embodiment, the exhaust port 22 is open between 110° and 250° ATDC, and, for simplicity in discussion, the reset pulse I1 occurs at top dead center (TDC). The location of the opening of the exhaust port and the reset pulse I1 remains the same each crankshaft revolution in FIGS. 4(a–e).

Figure 4A:
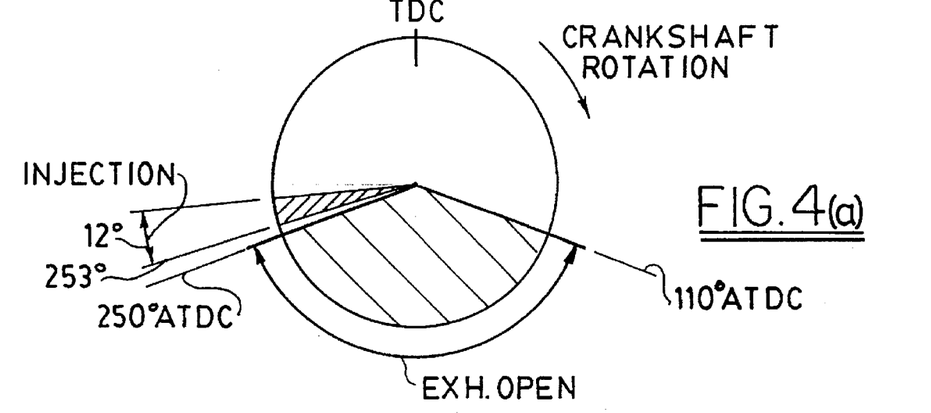
FIG. 4(a) is a diagram illustrating the working injection timing at start-up for the embodiment disclosed in FIG. 1.

In FIG. 4(a), the engine 10 is being cranked at 100 RPM, the engine 10 and ECU 12 having previously been shut down. In accordance with the foregoing, WIT equals IIT which is set to cause injection of fuel to start at 253° ATDC, 3° after the exhaust port 22 has closed. The relatively short pulse duration used for starting causes the injection valve 34 to remain open only 12° at this low engine speed.

Figure 4B:
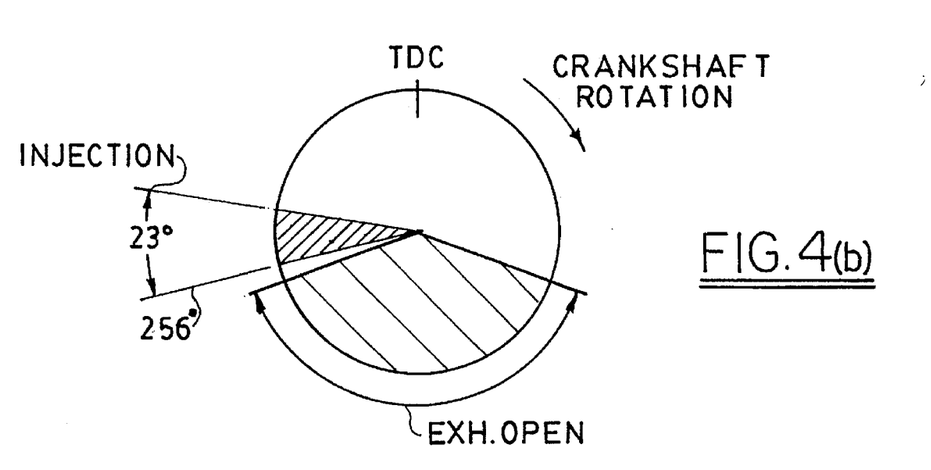
FIG. 4(b) is a diagram illustrating the working injection timing at a time during the initial acceleration of the engine for the embodiment disclosed in FIG. 1.

In FIG. 4(b) the engine has accelerated to 200 RPM, but virtually no time has elapsed since the engine 10 accelerated past 175 RPM. As a result, WIT still equals IIT. The higher speed increases the angle through which the crank rotates between the time ECU 12 generates the start of the pulse and the time the injector 30 starts to open. Therefore, the start of fuel injection occurs at a larger crank angle, 256° ATDC. The duration of injection may have shortened a bit in terms of time, but owing to the higher RPM, the injection valve 34 now stays open for 23° of crank rotation.

In both FIGS. 4(a) and 4(b), none of the injection occurs during the period that the exhaust port 22 is open, effectively minimizing the loss of any fuel through the exhaust ducting 52. However, FIG. 4(b) illustrates a relatively small angle until the ignition (just before TDC) occurs. This reduces the time available for the fuel and air to mix and is the reason that the injection timing is advanced as explained below.

Figure 4C:
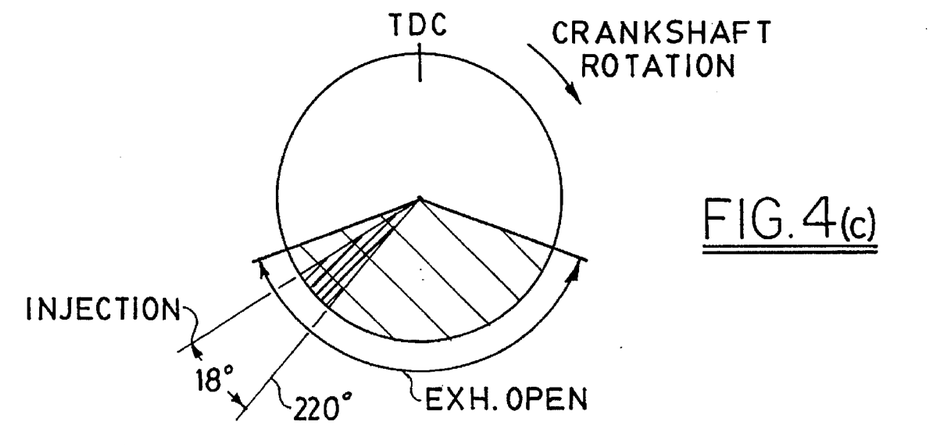
FIG. 4(c) is a diagram illustrating the working injection timing after three minutes have elapsed for the engine for the embodiment disclosed in FIG. 1.

In FIG. 4(c), conditions of engine speed (and load) are the same as those in FIG. 4(b), but a time, such as 3 minutes, has elapsed which has caused WIT to be decremented enough until it is made equal to PFIT. Thus, after 3 minutes the injection of fuel starts at 220° and lasts for 18°. The added mixing time makes the engine 10 more efficient so the duration of the pulse is reduced to decrease fuel quantity. Decreasing the fuel quantity maintains the engine speed at 200 RPM. Even though the injection is now open during the period that the exhaust port 22 is open, the amount of fuel escaping is not great because of the speed of the engine 10 and the location of the injector 30 in the cylinder 18.

Figure 4D:
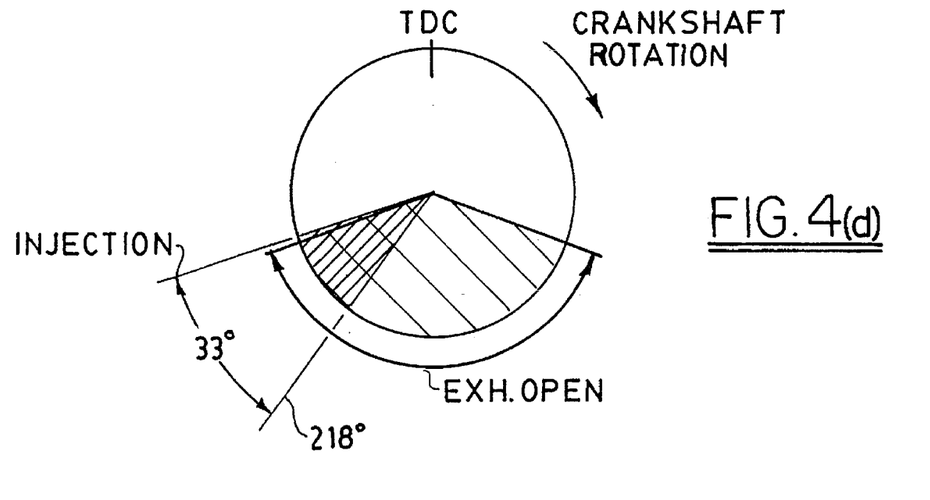
FIG. 4(d) is a diagram illustrating the working injection time when the engine for the embodiment disclosed in FIG. 1 has reached 265 RPMs.

FIG. 4(d) represents operation of the engine 10 at an intermediate speed of 265 RPM and a higher load than FIG. 4(c). PFIT, to which WIT is now set, has caused the start of injection to further advance to 218° ATDC. The increased load requires more fuel and thus a longer injection duration, resulting in the injector 30 being open for 33°.

Figure 4E:
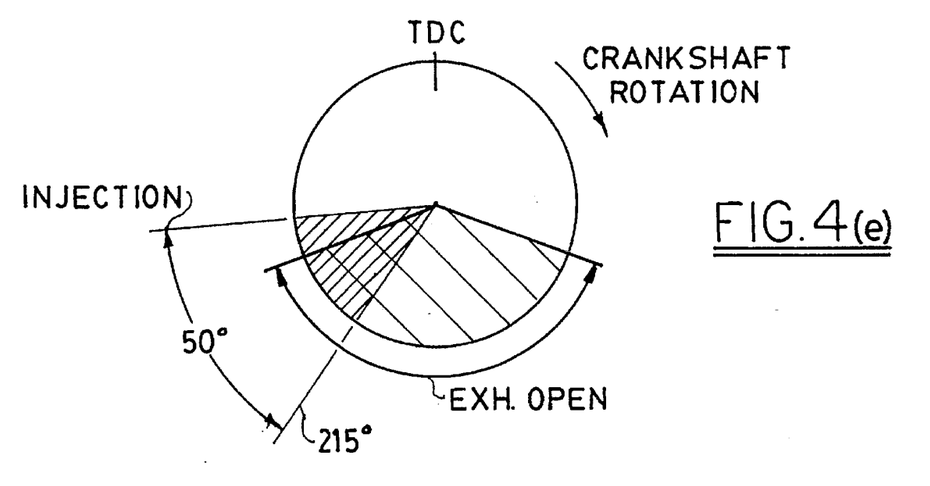
FIG. 4(e) is a diagram illustrating the working injection time when the engine for the embodiment disclosed in FIG. 1 has reached a speed of 330 RPM and full load.
Figure 5A:
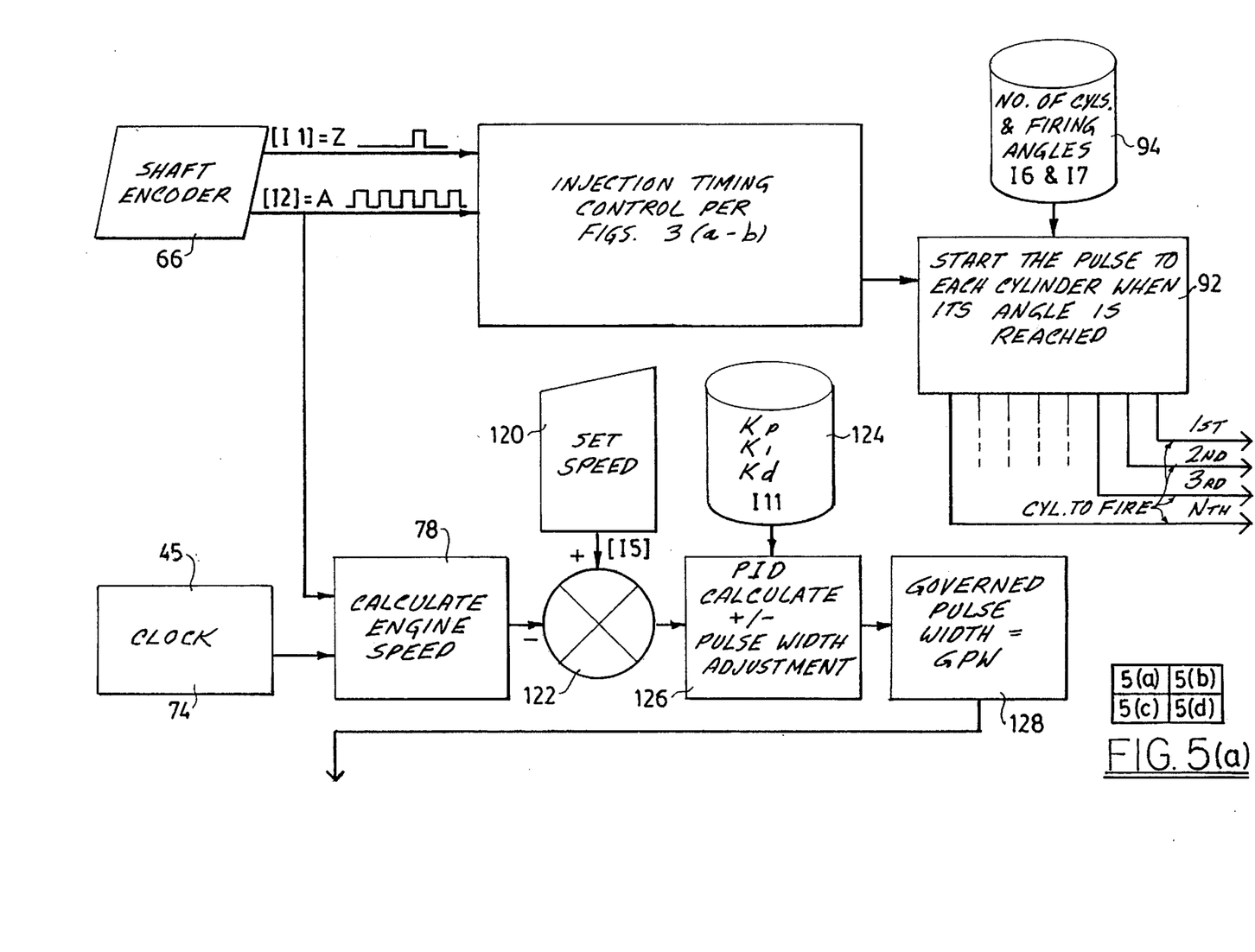
Figure 5B:
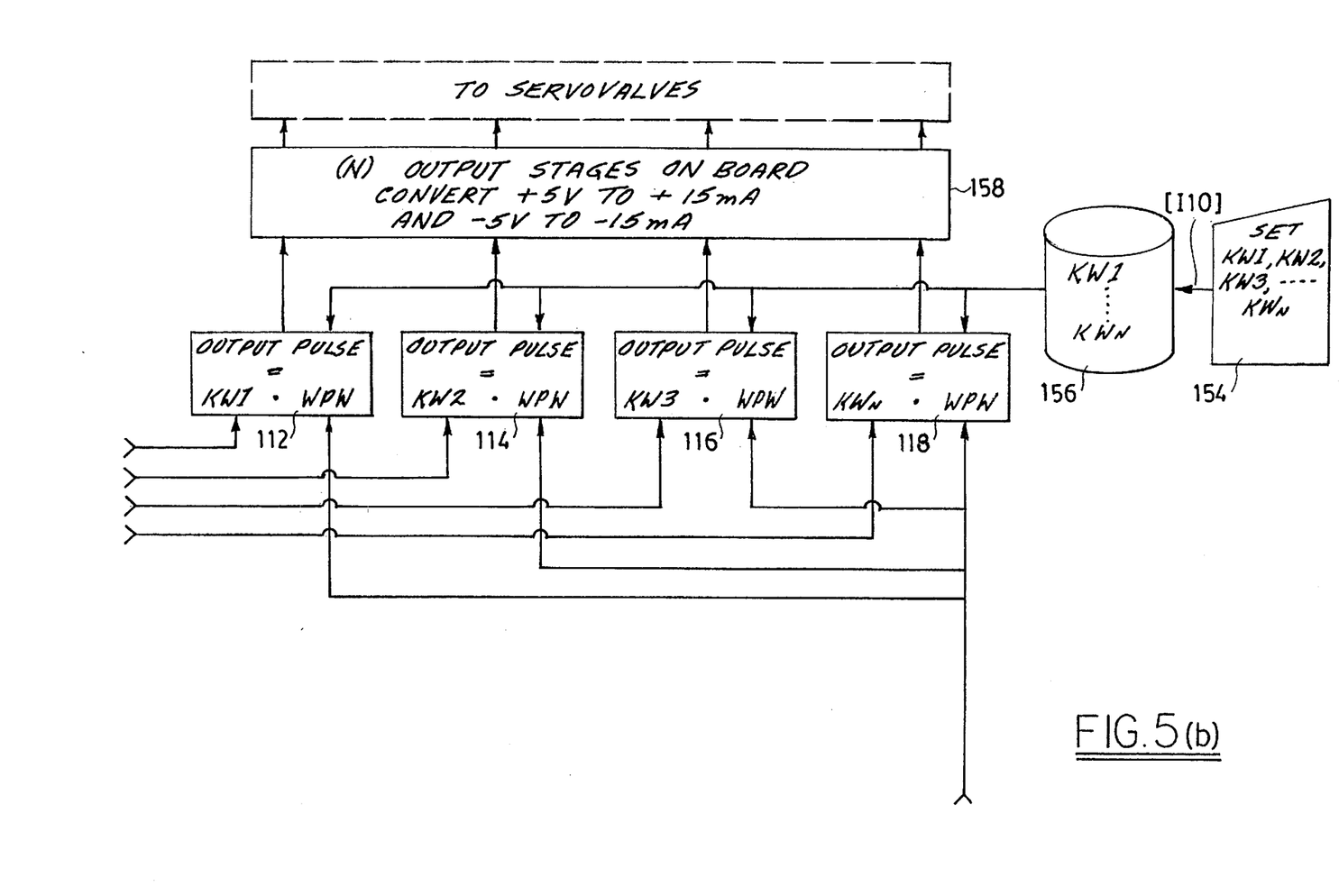
Figure 5C:
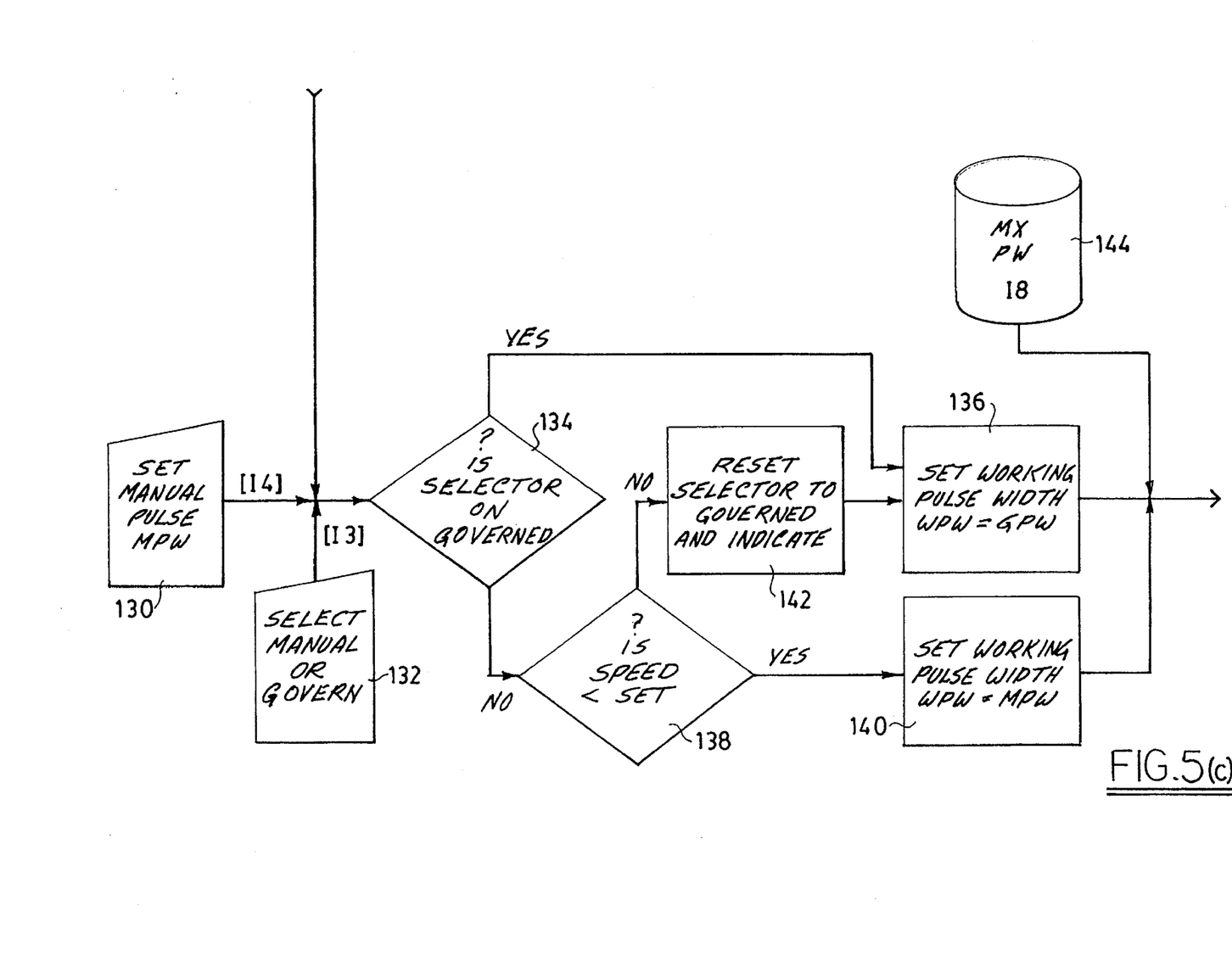
Figure 5D:
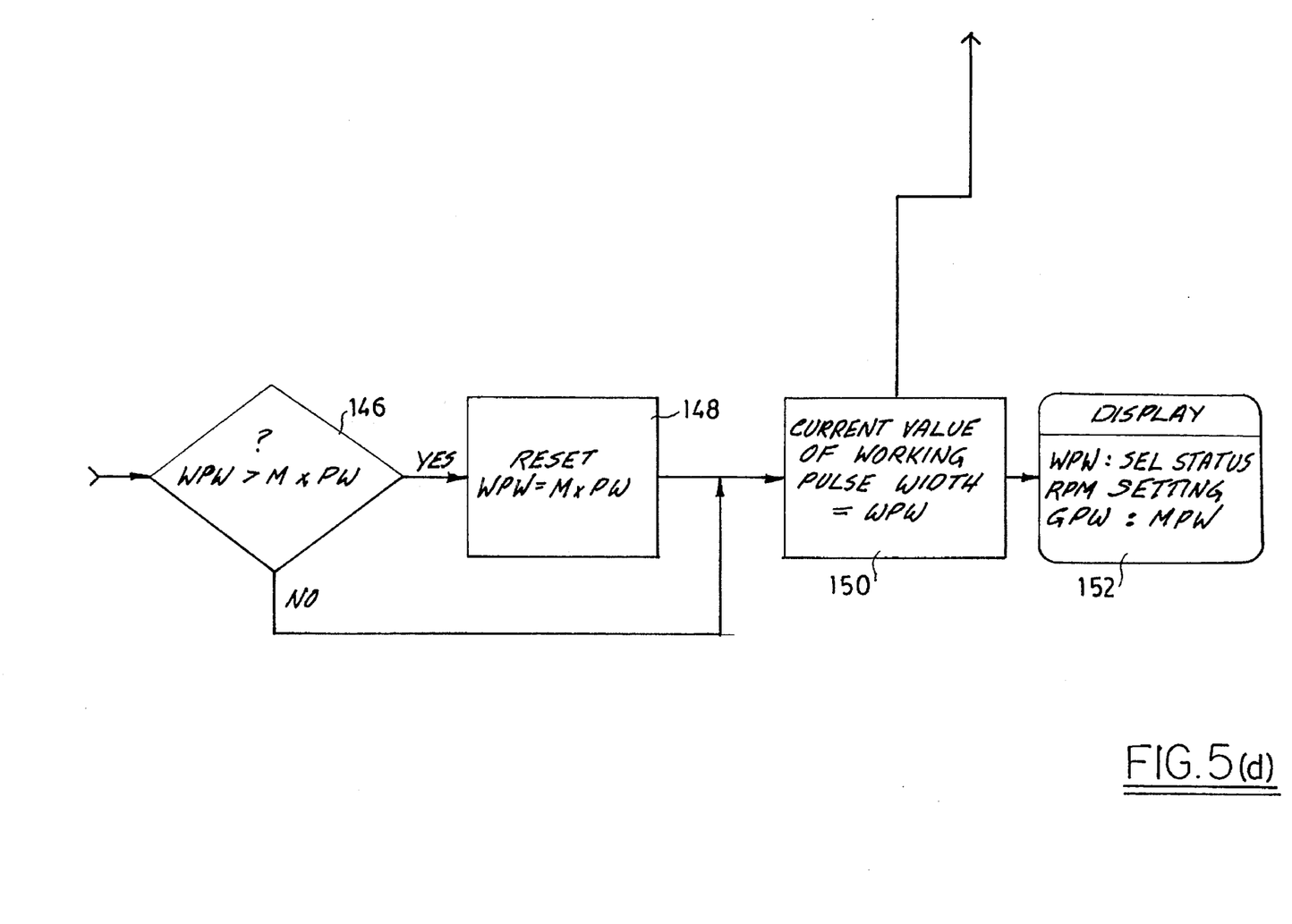

In FIG. 4(e) the engine 10 has reached its rated speed of 330 RPM and full load. Injection of fuel has been further advanced to 215° and WIT=PFIT. The higher load requires the longer injector open period, resulting in a crank angle of 50° for this period.

With the injection timing control, fuel loss through exhaust port 22 at start-up and emissions of unburned hydrocarbons can be minimized. Additionally, fuel injector 30 is set at or near an optimum fuel injection setting for starting the injection of fuel to the cylinder 18 over a range of speeds and conditions. Further, the injection timing can be adjusted to operate at optimum levels for gaseous fuel, as opposed to liquid fuel, because with gaseous fuel, there is no need to provide time for the fuel to vaporize during the fuel injection cycle.

Referring to FIGS. 5(a–d), a flowchart illustrating the steps of operation of the power balancing control is shown. As described earlier, when engine 10 is started and ECU 12 is turned on, shaft encoder 14 generates a "zero-reference" or "reset" pulse I1 and a series of counter pulses I2 (Step 66). Again in this particular embodiment, shaft encoder 14 generates 1440 counter pulses I2 per revolution. ECU 12 monitors shaft encoder 14 and based upon the reset pulse I1 and the counter pulses I2 calculates the angular position of the crankshaft 46 (Step 72).

The ECU 12 calculates the point to initiate the output pulse for fuel injector actuator 31 for cylinder 18 relative to the first to fire (Step 92), as described in FIGS. 3(a) and (b). The output pulses calculated in Step 92 are directed by ECU 12 to Steps 112, 114, 116 and 118, which are discussed later.

Meanwhile, the clock 45 generates the clock signal in Step 74 which is used along with the counter pulses I2 from shaft encoder 14 to calculate the engine speed (Step 78). More specifically, the number of counter pulses I2 is divided by the clock signal to give a speed which may be scaled to RPMs. Once the speed is calculated, in Step 78, the calculated speed is compared in step 122 to a set speed I5 entered by an operator in Step 120. A comparator outputs an error signal which is the difference between the calculated speed and set speed. The error signal along with governor gain factors: Kp=proportional gain, Ki=integral gain, and Kd=derivative gain input in Step 124, are used by ECU 12 in a manner well known in the art to modify the pulse duration or pulse width ("PW") (Step 126). PW signals to fuel injector actuator 31 how long each fuel injector 30 should remain open. The PW corrected by the error signal is known as governed pulse width ("GPW") and is stored in memory 43 in ECU 12 (Step 128).

Next, in Step 130 a manual pulse width I4 ("MPW") is input and in Step 132 a selection of either MPW or GPW, I3, is input. ECU 12 checks to see if GPW has been selected (Step 134). If GPW is selected in Step 134, then the YES branch is taken and the working pulse width ("WPW") for each cylinder is set equal to GPW (Step 136). If GPW was not selected in Step 134, then the NO branch is taken and if the speed is below the set speed in Step 138, then the YES branch is taken and WPW is set to MPW (Step 140). This is normally used only for starting the engine. If the speed is equal to or greater then the set speed in Step 138, then the NO branch is taken and the switch is reset to select GPW (Step 142). Once the switch is reset in Step 142, WPW is set to GPW (Step 136).

Next in Step 144 a maximum allowable pulse width ("MxPW") is entered. WPW is then compared against MxPW to see if it exceeds MxPW in Step 146, to prevent WPW from exceeding a value that could leave the fuel gas injector open too long for proper engine operation (Step 146). If WPW is greater than MxPW in step 146 then the YES branch is taken and WPW is reset to MxPW (Step 148). If WPW is equal to or less than MxPW in Step 146, then the NO branch is taken and WPW remains the same.

Next, the current value of WPW is set to WPW (Step 150). The value for WPW may be displayed by display 64 along with RPMs and GPW (Step 152). Next, each fuel injector's WPW is adjusted by multiplying it by a balance factor, KW1, KW2, KW3, and KWn, where KWn represents the balance factor for the last cylinder (Steps 112, 114, 116, and 118). ECU 12 monitors the output power in each cylinder with the pressure transducers (Steps 154) and derives a balance factor for each cylinder to balance the power output by all of the cylinders (Step 156). Preferably, the balance factors are between 0.75 and 1.00. For example, the ECU may calculate what the average power output is from each cylinder and adjust the power in each cylinder to the average output power by the cylinders or the ECU 12 may adjust the output power in each to some preselected power level. Once the balance factors have been multiplied with the WPW in Steps 112, 114, 116, and 118, then the output pulses are sent to an output stage which converts the voltages to currents which can be used by the fuel injection actuator 31 to operate the valve 34 in the fuel injector 30 (Step 158). With power balancing, the engine will run more smoothly and the life of the engine will be increased.

Having thus considered the basic concept of the invention, it will be readily apparent to those skilled in the art that the foregoing detailed disclosure is intended to be presented by way of example only and is not limiting. Various alterations, improvements, and modifications will occur to those skilled in the art, though not expressly stated herein. These modifications, alterations and improvements are intended to be covered hereby, and are within the spirit and scope of the invention.

What is claimed is:

1. A method for controlling the injection timing and power balance for each cylinder in a two-stroke gaseous fuel engine, the engine having one or more cylinders each with an exhaust port, a piston in each of the cylinders and adapted to reciprocate in the cylinder, a rod connecting the piston to a crankshaft, a cylinder head for each of the cylinders, the cylinder head sealing each cylinder and providing an opening for a fuel injector, and a control unit coupled to a shaft encoder, the shaft encoder connected to the crankshaft, the engine having a working injection time which sets the time for each injector to start an injection of fuel to the cylinder, said method comprising the steps of:

determining a programmed function injection time, the programmed function injection time is an optimum injection time to be used for the working injection time at the current operating speed;

setting the working injection time to an initial injection time, the initial injection time being in a retarded position with respect to the programmed function injection time;

measuring the speed of the crankshaft;

comparing the monitored speed with a first preset limit;

advancing the working injection time at a predetermined rate when the monitored speed exceeds the first preset limit; and setting the working injection time to the programed function injection time when the working injection time is equal to or less than the programmed function injection time.

2. The method according to claim 1 wherein the initial injection time starts the injection of fuel after the exhaust port is closed by the piston.

3. The method according to claim 1 wherein the step of measuring the speed of the crankshaft further comprises the steps of:

generating a series of counter pulses each crankshaft revolution;

generating a clock signal; and calculating the engine speed from the counter pulses and clock signal.

4. The method according to claim 3 further comprising the steps of:

detecting a reset pulse generated each crankshaft revolution; and setting a flag when the first reset pulse is detected, wherein the monitored speed is compared with a first preset limit when the flag is set.

5. The method according to claim 4 further comprising the steps of:

calculating the initial injection time for each cylinder; and calculating the programmed function injection time for each cylinder from a programmed function of speed.

6. The method according to claim 5 further comprising the steps of:

checking the flag;

delaying a predetermined amount of time before advancing the working injection time a predetermined amount if the flag is set and the monitored speed exceeds the first preset limit;

setting the working injection time to the initial injection time if the flag is set and the monitored speed is less than the first preset limit; and clearing the flag when the working injection time is equal to or greater than the programed function injection time.

7. The method according to claim 6 further comprising the step of:

starting a pulse to each fuel injector to start the injection of fuel when the crank angle equals the working injection timing plus the firing angle for each fuel injector.

8. The method according to claim 3 further comprising the steps of:

calculating an error signal for the difference between the actual speed and a set speed;

calculating a first pulse width which controls the duration of each injection; and adjusting the first pulse width in response to the error signal to create a governed pulse width.

9. The method according to claim 8 further comprising the steps of:
   setting a manual pulse width;
   selecting a manual pulse width or a governed pulse width;
   setting a working pulse width to a governed pulse width, if the governed pulse width is selected;
   setting the working pulse width to a governed pulse width, if the manual pulse width is selected and the actual speed exceeds the set speed; and
   setting the working pulse width to a manual pulse width, if the manual pulse width is selected and the actual speed is less than the set speed.

10. The method according to claim 9 further comprising the step of:
    resetting the working pulse width to a maximum pulse width, if the working pulse width exceeds the maximum pulse width.

11. The method according to claim 10 further comprising the step of:
    converting the working pulse width to an output pulse for each fuel injector.

12. The method according to claim 11 further comprising the steps of:
    measuring an index of the power output in each cylinder; and
    calculating a balancing factor for each cylinder, in response to the measured index; and
    multiplying the output pulse by the calculated balance factor.

13. The method according to claim 12 wherein the balance factor is between 0.75 and 1.0.

14. A control unit for controlling the injection timing and power balance for each cylinder in a two-stroke gaseous fuel engine having one or more cylinders each with an exhaust port, a piston in each of the cylinders adapted to ride in the cylinder, a rod connecting the piston to a crankshaft, a cylinder head for each of the cylinders, the cylinder head sealing each cylinder and providing an opening for a fuel injector, the fuel injector having a valve separating fuel in the injector from the cylinder, and a shaft encoder connected to the control unit and the crankshaft, the engine having a working injection time which sets the time for each injector to start an injection of fuel to the cylinder, the control unit comprising:
    means for determining a programmed function injection time, the programmed function injection time is a desired injection time to be used for the working injection time at the current operating speed;
    means for setting the working injection time to an initial injection time, the initial injection time being in a retarded position with respect to the programmed function injection time;
    means for measuring the speed of the crankshaft;
    means for comparing the monitored speed with a first preset limit;
    means for advancing the working injection time at a predetermined rate when the monitored speed exceeds the first preset limit; and
    means for setting the working injection time to the programed function injection time when the working injection time is advanced to be equal to or less than the programmed function injection time.

15. The control unit according to claim 14 wherein the initial injection time starts the injection after the exhaust port is closed by the piston.

16. The control unit according to claim 14 wherein the means for measuring the speed of the crankshaft further comprises:
    means for generating a series of counter pulses each crankshaft revolution;
    means for generating a clock signal; and
    means for calculating the engine speed from the counter pulses and clock signal.

17. The control unit according to claim 16 further comprising:
    means for detecting a reset pulse generated each crankshaft revolution; and
    means for setting a flag when the first reset pulse is detected, wherein the monitored speed is compared with a first preset limit when the flag is set.

18. The method according to claim 17 further comprising:
    means for calculating the initial injection time for each cylinder; and
    means for calculating the programmed function injection time for each cylinder from a programed function of speed.

19. The control unit according to claim 18 further comprising:
    means for checking the flag;
    means for delaying a predetermined amount of time before advancing the working injection time a predetermined amount if the flag is set and the monitored speed exceeds the first preset limit;
    setting the working injection time to the initial injection if the flag is set and the monitored speed is less than the first present limit; and
    means for clearing the flag when the working injection time is equal to or less than the programmed function injection time.

20. The control unit according to claim 19 further comprising:
    means for starting a pulse to the valve for each fuel injector to start the injection of fuel when the crank angle equals the working injection timing plus the firing angle for each fuel injector.

21. The control unit according to claim 16 further comprising:
    means for calculating an error signal for the difference between the actual speed and a set speed;
    means for calculating a first pulse width for the duration of each injection; and
    means for adjusting the first pulse width in response to the error signal to create a governed pulse width.

22. The control unit according to claim 21 further comprising:
    means for setting a manual pulse width;
    means for selecting a manual pulse width or a governed pulse width;
    means for setting a working pulse width to a governed pulse width, if the governed pulse width is selected;
    means for setting the working pulse width to a governed pulse width, if the manual pulse width is selected and the actual speed exceeds the set speed; and
    means for setting the working pulse width to a manual pulse width, if the manual pulse width is selected and the actual speed is less than the set speed.

23. The control unit according to claim 22 further comprising:

means for resetting the working pulse width to a maximum pulse width, if the working pulse width exceeds the maximum pulse width.

24. The control unit according to claim 23 further comprising:

means for converting the working pulse width to an output pulse for each fuel injector.

25. The control unit according to claim 24 further comprising:

means for measuring an index of the power output in each cylinder; and means for calculating a balancing factor for each cylinder, in response to the measured index; and means for multiplying the output pulse by the calculated balance factor.

26. The control unit according to claim 25 wherein the balance factor is between 0.75 and 1.0.

\* \* \* \* \*